Aug. 13, 1929.  C. M. YODER  1,724,059
MACHINE FOR CUTTING SHEET MATERIAL
Filed July 14, 1924  3 Sheets-Sheet 1
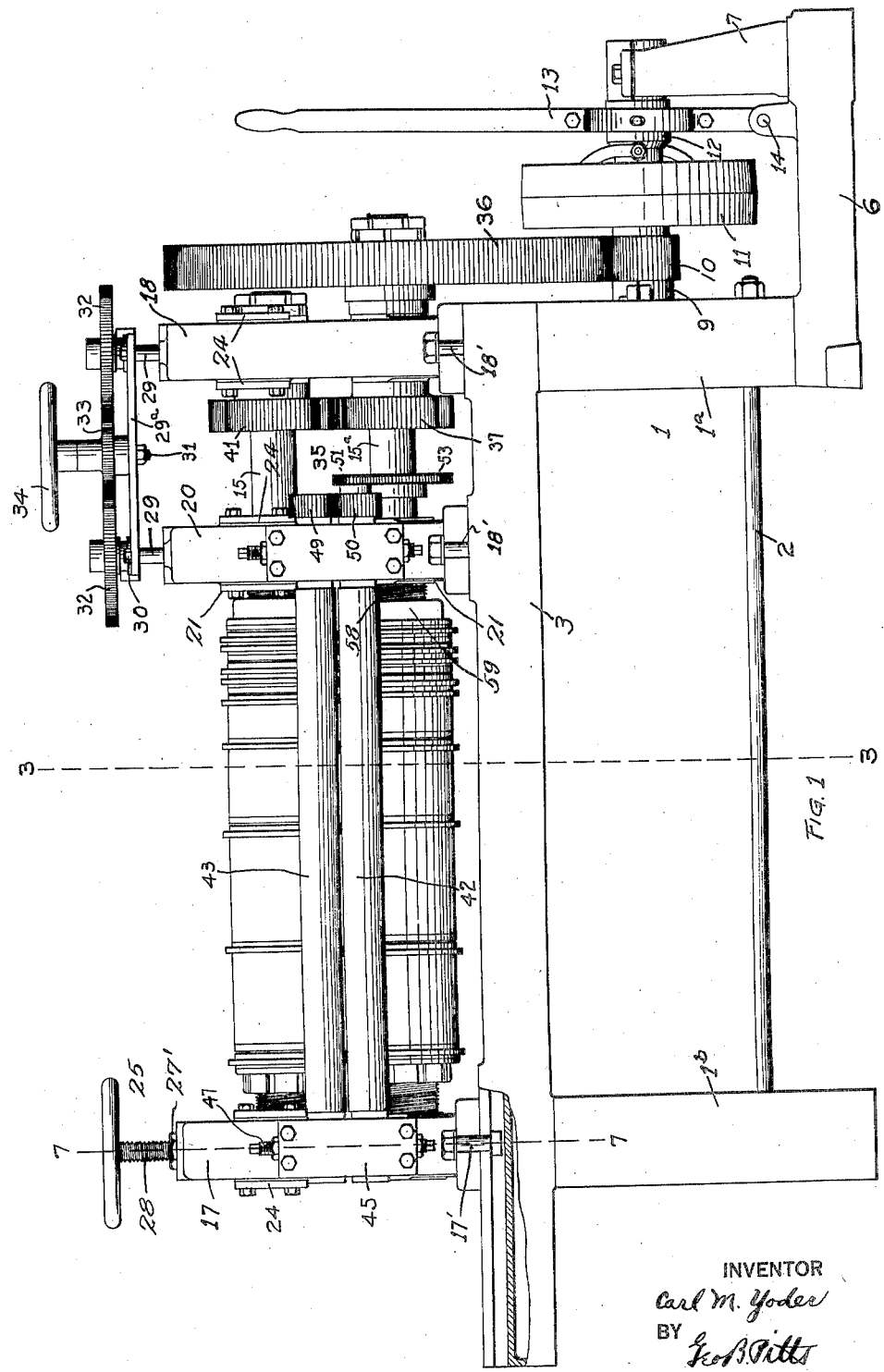
INVENTOR
Carl M. Yoder
BY Geo B Pitts
ATTORNEY

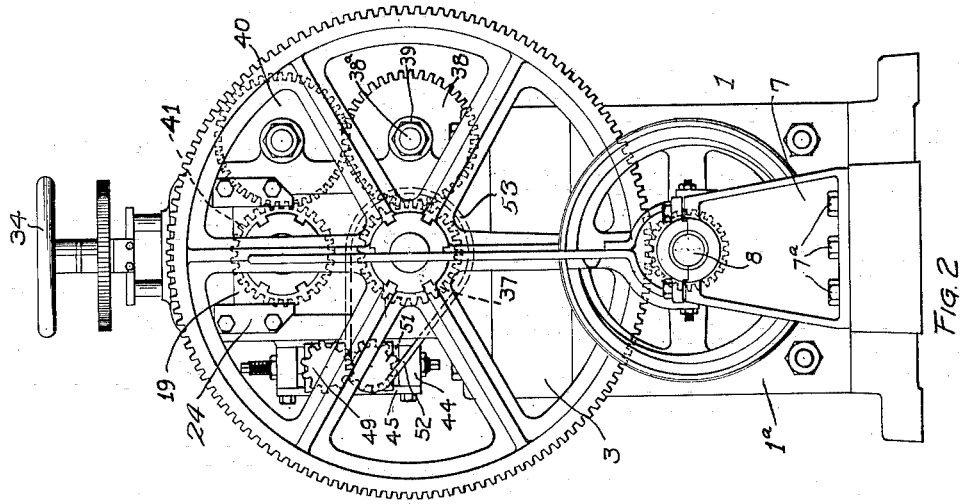
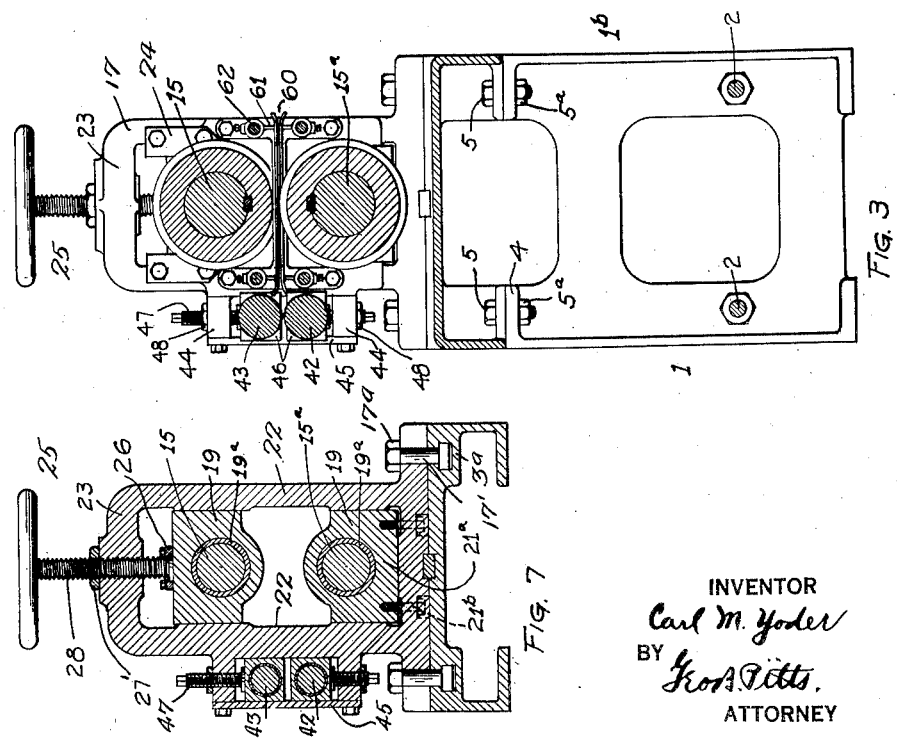

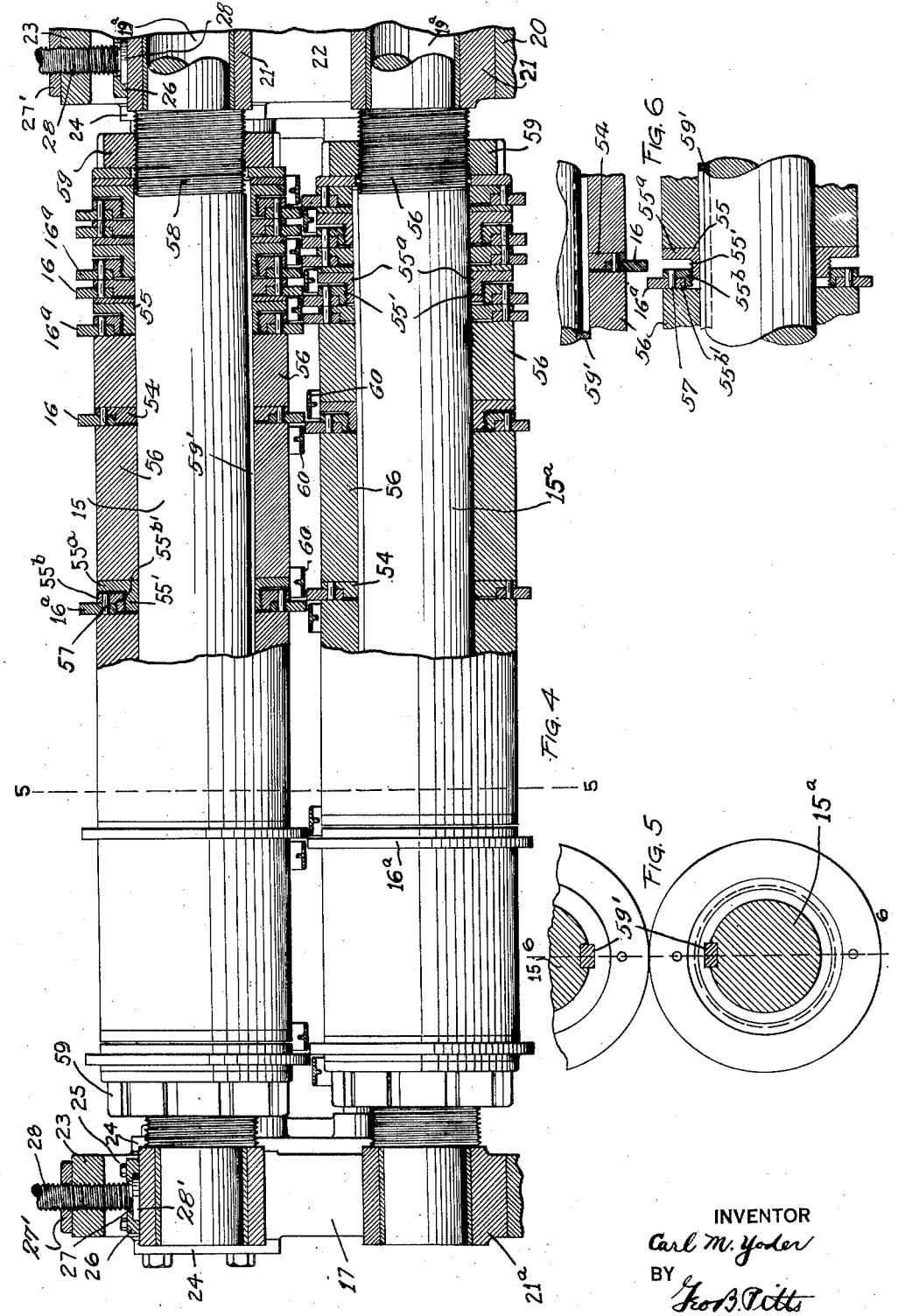

Patented Aug. 13, 1929.

1,724,059

UNITED STATES PATENT OFFICE.

CARL M. YODER, OF CLEVELAND, OHIO.

MACHINE FOR CUTTING SHEET MATERIAL.

Application filed July 14, 1924. Serial No. 725,847.

This invention relates to a machine for cutting sheet material, particularly that type of machine in which the sheet moves between a pair or pairs of rolls carrying ring cutters. The invention is applicable to a machine for making one or more cuts in sheet material, or cutting the sheet or sheets into a plurality of strips of uniform or varying widths. The sheet material may be formed from various materials, including metal sheets, such as sheet steel.

One object of the invention is to construct a machine of this character having improved means for adjusting one ring cutter relative to the other ring cutter of a pair in a relatively simple manner.

A further object of the invention is to provide an improved adjusting means for a plurality of cutters of a cutting machine whereby a plurality of cuts of any predetermined width may be effected.

Another object of the invention is to provide in a machine of this character having a plurality of ring cutters, improved means for adjusting either or both cutters of each pair and relatively simple means for maintaining the cutters in adjusted position.

Another object of the invention is to provide in a cutting machine of this character having a plurality of pairs of cutters, relatively simple means for spacing and supporting the pairs of cutters relatively to each other upon their supporting rolls.

Another object of the invention is to so arrange the cutters of each pair with respect to adjacent pairs that sheets of material may be cut without distorting the metal.

Other objects of the invention will be apparent to those skilled in the art to which my invention relates from the following description taken in connection with the accompanying drawings, wherein Fig. 1 is a front elevation of a machine embodying my invention.

Fig. 2 is an end elevation of the machine.

Fig. 3 is a transverse section on the line 3—3 of Fig. 1.

Fig. 4 is a fragmentary view, partly in section and partly in elevation, of the rolls and ring cutters mounted thereon.

Fig. 5 is a fragmentary section on the line 5—5 of Fig. 4.

Fig. 6 is a section on the line 6—6 of Fig. 5.

Fig. 7 is a section on the line 7—7 of Fig. 1.

In the drawings, 1 indicates as an entirety a frame preferably comprising a pair of upright members $1^a$, $1^b$, suitably connected in spaced relation by one or more rods 2, which are connected at their opposite ends to said members, and a bed 3. The upright members $1^a$, $1^b$, and bed 3 are preferably provided with inturned lugs 4 having aligned openings through which extend bolts 5 carrying nuts $5^a$ by means of which the lugs are rigidly connected and thus serve to secure the bed to the upright members in fixed relationship. The upright member $1^a$ is provided with an extension 6. At its outer end the extension 6 supports an upstanding shaft hanger 7 which provides a suitable bearing for the outer end of a drive shaft 8. The shaft hanger 7 may be secured to the extension 6 by a plurality of cap screws $7^a$ (see Fig. 2). The inner end of the shaft 8 is mounted in a bearing, supported in a box or casing 9 which is mounted on the outer face of the upright member $1^a$ (see Fig. 1). 10 indicates a pinion fixed to the shaft 8. The purpose of the pinion will be later set forth.

The shaft 8 may be driven in any desired manner, but the power is preferably applied thereto by means of a belt pulley 11 loosely mounted on the shaft and a clutch, the elements of which are connected respectively to the pulley 11 and shaft 8. The clutch element which is connected to the shaft is slidably mounted thereon so as to move into engagement with the other clutch element (to connect the pulley to the shaft) and out of engagement therewith, being operated in either direction by a collar 12 suitably connected to a hand lever 13 which is pivotally supported upon a lug 14 mounted on the extension 6.

17, 18, indicate standards mounted on the bed 3, adjacent the ends thereof, and supporting boxes 19 having suitable bearings $19^a$ to receive and support the opposite ends of the rolls 15, $15^a$. 20 indicates an intermediate standard mounted on the bed 3 and supporting boxes 21 having bearings $19^a$ for the rolls 15, $15^a$, through which the latter extend, this standard being disposed on the bed 3 at a point beyond the ring carrying portion of the rolls and serving to prevent distortion thereof during the feeding of a sheet of material between them. The standards, 17, 18, 20, are provided with suitable bases, which are secured to the bed 3 by suitable devices, such as bolts 17' for the standard 17 (for a purpose to be later set forth) and cap screws 18' for the standards 18, 20.

The standards 17, 18, and 20 comprise upright members having spaced side walls 22 and a connecting wall 23 at the upper ends of the spaced side walls, to provide a seat for the bearing boxes for the roll $15^a$ and guides for the bearing boxes for the upper roll 15.

The boxes 19, 21, for the bearings $19^a$ are preferably similar in construction except that each of the boxes for the roll $15^a$ are provided with a base portion $21^a$ which fits upon the end wall or seat at the lower ends at the spaced side walls 22. By preference the bearing boxes 19, 21, for the roll $15^a$ are rigidly secured to the standards 17, 18, 20, by pairs of bolts $21^b$, fitting openings in the base portions (the heads of the bolts being countersunk) and engaging screw threaded openings in the bases $21^a$. 24 indicates pairs of plates disposed upon opposite sides of the standards 17, 18 and 20 and engaging with the end walls of the boxes 19 and 21 to prevent movement thereof laterally of the standards or endwise of the rolls 15, $15^a$, and cooperating with the side walls 22 to slidably support the adjacent bearing boxes. As above set forth the boxes 19, 21, for the bearings which support the roll 15 are slidable between the side members 22, respectively; but are maintained in fixed relationship with the bearing boxes for the bearings which support the roll $15^a$ by adjustable supporting devices indicated as an entirety at 25. Of these devices 26 indicates a plate secured by cap screws to the upper face or wall of each bearing box for the roll 15 and formed with an opening 27. 28 indicates a screw extending through a screw threaded opening formed in the adjacent connecting wall 23. The lower end of the screw 28 rotatably fits the opening 27 and carries at its free end a head 28, the under side of the plate 26 being recessed to receive the head. As a result of this construction and arrangement, it will be seen that the screws 28, through their engagement with the plates 26 serve to support the roll 15 in any predetermined relationship relative to the roll $15^a$ and that by rotating the screws the roll may be raised and lowered—that is adjusted—at will; each screw being provided with a hand wheel or other device to effect rotation thereof. The screws are locked in adjusted position by nuts 27'.

Due to the fact that a pair of standards 18, 20, is disposed at one end of the bed 3, to support the corresponding ends of the rolls 15, $15^a$, I prefer to provide means for adjusting the screws 28 that are mounted in these standards from a common source or by a single wheel. For this purpose I provide the following instrumentalities: 29 indicates pairs of upstanding pins mounted on the connecting walls 23 of the standards 18, 20. The pins 29 are reduced at their upper ends to provide shoulders which form a seat for a plate $29^a$. The reduced ends of the pins are provided with screw threads to receive nuts 30 which are clamped against the plate $29^a$ to hold it in fixed relation to the supporting pins 29. The plate $29^a$ is formed with openings to receive the upper ends of the screws 28, and the lower end of a shaft 31 disposed mid-way between the screws 28. The upper ends of the screws 28 and the stud shaft 31 carry gear wheels 32, 32, 33, respectively, the gear wheels 32 being of the same size and the gear wheel 33 being of proper diameter to fit between and mesh with the gear wheels 32, 32, simultaneously, so that by rotating the shaft 31, or the gear wheel 33, both gears 32 will be rotated at the same speed, and they in turn will rotate the screws equal angular distances, so that the adjacent bearing boxes will be adjusted uniformly upwardly or downwardly. 34 indicates a hand wheel which is fixed to the gear 33 either directly or through the shaft 31 so that it may be rotated in either direction to the desired extent.

35 indicates as an entirety a gear train driven by the pinion 10 and operating to rotate the rolls 15, $15^a$, at a uniform speed. The gear train preferably comprises a gear 36 mounted on the extended end of the roll $15^a$ and in mesh with the pinion 10. 37 indicates a gear mounted on the roll $15^a$, preferably between the standards 18 and 20 and meshing with a gear 38 mounted on a shaft $38^a$ which in turn is supported at its opposite ends by lugs 39 formed integrally with and extending laterally from the adjacent side walls 22 of the standards 18, 20. 40 indicates a gear in mesh with the gear 38 and mounted thereabove in a manner similar to the mounting for the latter gear. 41 indicates a gear fixed to the roll 15 and in mesh with the gear 40. As shown in Fig. 1, the gears 37, 38, 40 and 41 are in alignment with each other and transmit the power from the roll $15^a$ to the roll 15. As the gears 38 and 40 are of the same size, and the respective gears with which they mesh are of the same size, it will be seen that the roll 15 will be driven at the same rate of speed as the roll $15^a$ and in a direction opposite thereto, so that when a sheet of material is fed between the rolls, it will be moved thereby in a substantially horizontal plane.

42, 43, indicates a pair of guide rolls mounted at one side of the rolls 15, $15^a$, and disposed so as to receive a sheet of material between them in a plane in which the latter moves between the latter rolls. 44 indicates pairs of arms extending laterally from one side of the standards 17, 20, and supporting at their outer ends vertical plates 45, which cooperate with the adjacent faces of the standards 17 and 20 to form guideways for bearing boxes 46 supporting the opposite ends of the rolls 42, 43. The arms 44 are provided with screw threaded openings to receive screws 47, the inner ends of which engage the bearing boxes and operate to force the rolls together or to prevent relative movement thereof away from each other, due to the movement of the sheet material between them. The screws 47 may be provided with hand wheels to turn them, but are preferably shaped at their upper end to receive a suitable tool for this purpose. 48 indicates nuts arranged to be screwed or clamped on the screws 47 against the arms 44 and thus lock the screws against movement. The inner ends of the rolls 42, 43, are extended and carry gear wheels 49, 50, in mesh with each other, so that they may be rotated in opposite directions, to feed and guide the sheet material while passing through the rolls 15, 15$^a$. The gears 49, 50, are of the same size, so that both rolls will be rotated at the same speed. The lower roll carries at its free end a sprocket 51 around which a chain 52 runs. The chain 52 runs around a sprocket 53 fixed to the roll 15$^a$ so as to be driven thereby.

The ring cutters 16, 16$^a$, of each pair, are preferably respectively supported upon devices 54, 55, surrounding the rolls 15, 15$^a$, and such devices on each roll are held in spaced relation by sleeves 56, which may be of any desired length so as to space the supporting devices on each roll from each other the desired distance. The supporting device for one cutter of each pair preferably comprises a ring member having an annular recess to receive the ring cutter 16 which is secured therein by a suitable rivet; whereas the supporting device for the other cutter 16$^a$ of each pair preferably comprises a pair of relatively movable members permitting adjustment of the cutter supported thereby in a direction endwise of the adjacent roll so that its cutting edge may be adjusted relative to the cutting edge of the other cutter of the pair. The relatively movable members of each supporting device 55 comprise a ring member 55$^a$ having a reduced portion 55′ provided with screw threads and a ring member 55$^b$, carrying the ring cutter 16$^a$ and provided with screw threads on its inner wall to fit the screw threads of the reduced portion 55′. The ring member 55$^b$ is formed with an annular recess 55$^{b′}$ to receive the adjacent ring cutter 16$^a$, the latter being secured in the recess by rivets 57. The ring member 55$^b$ is adapted to be rotated in any desired manner, for example, by a suitable tool, such operation serving to adjust it on the member 55$^a$ endwise of the adjacent roll relative to the ring cutter 16 as shown in Fig. 6. Those sections of the rolls 15, 15$^a$, disposed between the bearing boxes 19, 21, and the portions thereof carrying the supporting devices 54, 55, and sleeves 56 are provided with screw threads, as shown at 58, to receive clamping collars 59. In the assembly of the cutter supporting devices 54, 55, and sleeves 56, I provide the desired number of pairs of cutters and spaced them apart the desired distances by sleeves 56 of the proper length, depending upon the size of the sheet to be cut and the number of cuts to be made therein. In the drawings, I have arranged four pairs of cutters in cutting position and position the remaining pairs at one end of the rolls 15, 15$^a$, in inoperative position or beyond the adjacent lateral edge of the sheet to be cut. By removing the sleeves 56 and substituting therefor sleeves of shorter lengths, the pairs of cutters can be positioned closer together and a larger number of cutters positioned for engagement with the sheet of material to be fed through the machine. In the assembly of these elements upon the roll, I utilize all the space between the clamping collars 59, so that one thereof may serve as an abutment and the other may be tightened against the supporting devices and sleeves to clamp all of said supporting devices in fixed relation. As the ring members 55$^b$ have a thickness equal to the length of the reduced portion 55′, it will be seen that any adjustment thereof relative to the ring member 55$^a$ will move the outer face of the cutter 16$^a$ laterally so that it will be engaged by the adjacent end of the adjoining sleeve. Accordingly, when the clamping collars are tightened with respect to each other on the rolls 15, 15$^a$, such clamping action will serve to lock the ring member 55$^b$ relative to the ring member 55$^a$. The supporting devices 54, 55, and sleeves 56 are of a size to permit their endwise movement of the roll in a ready manner. Each roll and the supporting devices and sleeves fitted thereon, are provided with grooves to receive a key 59′ which prevents rotary movement of these elements on the roll.

60 indicates pairs of guides extending between the rolls 15, 15$^a$, and supported in co-operative relation to the lateral edges of the cutters 16, 16$^a$, in tangential planes above and below the plane which intersects their co-acting cutting points, as they engage the sheet metal to cut it, thereby serving to prevent distortion of the metal as cutting takes place. The guide devices preferably comprise relatively narrow shoes extending at right angles to the rolls 15, 15$^a$, and supported at their free ends by brackets 61, supported by pairs of rods 62 mounted at their opposite ends in the opposing end faces or walls of the side walls 22 of the standards 17, 20, the opposite ends of the guide devices being bent away from each other so as to readily receive the sheet material between them when fed through the machine in either direction. The brackets 61 are adjustably connected to the rods 62 so that they may be moved longitudinally of the latter into any desired position dependent upon the adjustment of any cutter or pairs of cutters.

To prevent endwise movement of the rolls 15, 15ª, those portions thereof which carry the pairs of cutters, are enlarged with respect to the portions which fit the bearings in the bearing boxes 19, 21. By reason of this construction, shoulders are provided to engage the bearing boxes so that the latter will prevent the rolls from moving axially in either direction.

While the cutters 16, 16ª, may be arranged on the rolls 15, 15ª, in any desired manner, I prefer to so arrange the cutters that each cutter except the end cutters on each roll and one of the adjacent cutters on the same roll will be disposed between two cutters on the other roll with which they respectively form the pairs of cutters.

By this arrangement the action of one pair of cutters tending to distort the metal will be equalized or off-set by the adjacent pair of cutters, thereby avoiding the necessity of straightening the cut sheets prior to their being used in any manner.

To assemble or disassemble the cutters or to adjust the spaced relationship of the pairs thereof, I disengage the standard 17 and bearing boxes 19, 21, supported thereby from the outer ends of the rolls 15, 15ª, and then loosen and remove the adjacent clamping collars 59, whereupon the supporting devices for pairs of cutters 16, 16ª, and sleeves 56 may be moved endwise and removed from the rolls and then reassembled thereon with sleeves of the desired length to position the supporting devices for the cutters in the desired spaced relation. To permit of this operation, the base portion of the standard 17 is slidably connected to the bed 3 so that it may be moved laterally, that is, endwise of the bed beyond the free ends of the rolls 15, 15ª. For this purpose, the bed 3 is formed in its upper surface with T-shaped slots 3ª to receive the heads of the bolts 17' so that upon loosening of the nuts 17ª, the standard 17 can be moved toward the end of the bed to permit removal and assembly of the parts as above described. By providing a pair of standards (18, 20) for the opposite ends of the rolls 15, 15ª, it will be seen that they will be supported in assembled relationship after the standard 17 has been moved laterally and while the disassembly and re-assembly operations are taking place.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. In a machine of the class described the combination of a pair of rolls, a plurality of ring cutters secured to one of said rolls, a plurality of ring members mounted on the other roll, a plurality of ring members each having screw threaded connection with one of said first mentioned ring members to permit of its adjustment thereon and provided with a ring cutter, means for securing each of the last mentioned ring cutters to the adjacent ring member, a spacer between each of the first mentioned ring members and the adjacent adjustable ring member, and means for securing the spacers and ring members in fixed relation.

2. In a machine of the class described, the combination of a pair of rolls, a ring cutter surrounding and mounted on one of said rolls, a ring member surrounding and adjustably mounted on the other roll, a ring element having screw threaded connection with said ring member to permit of its adjustment on said member, and a ring cutter secured to and movable with said ring element.

In testimony whereof, I have hereunto subscribed my name.

CARL M. YODER.